J. C. CARTMILL.
VAT FOR CLEANING HOGS.
APPLICATION FILED APR. 21, 1909.

944,230.

Patented Dec. 21, 1909.
2 SHEETS—SHEET 1.

Witnesses

Inventor
J. C. Cartmill,
Attorney

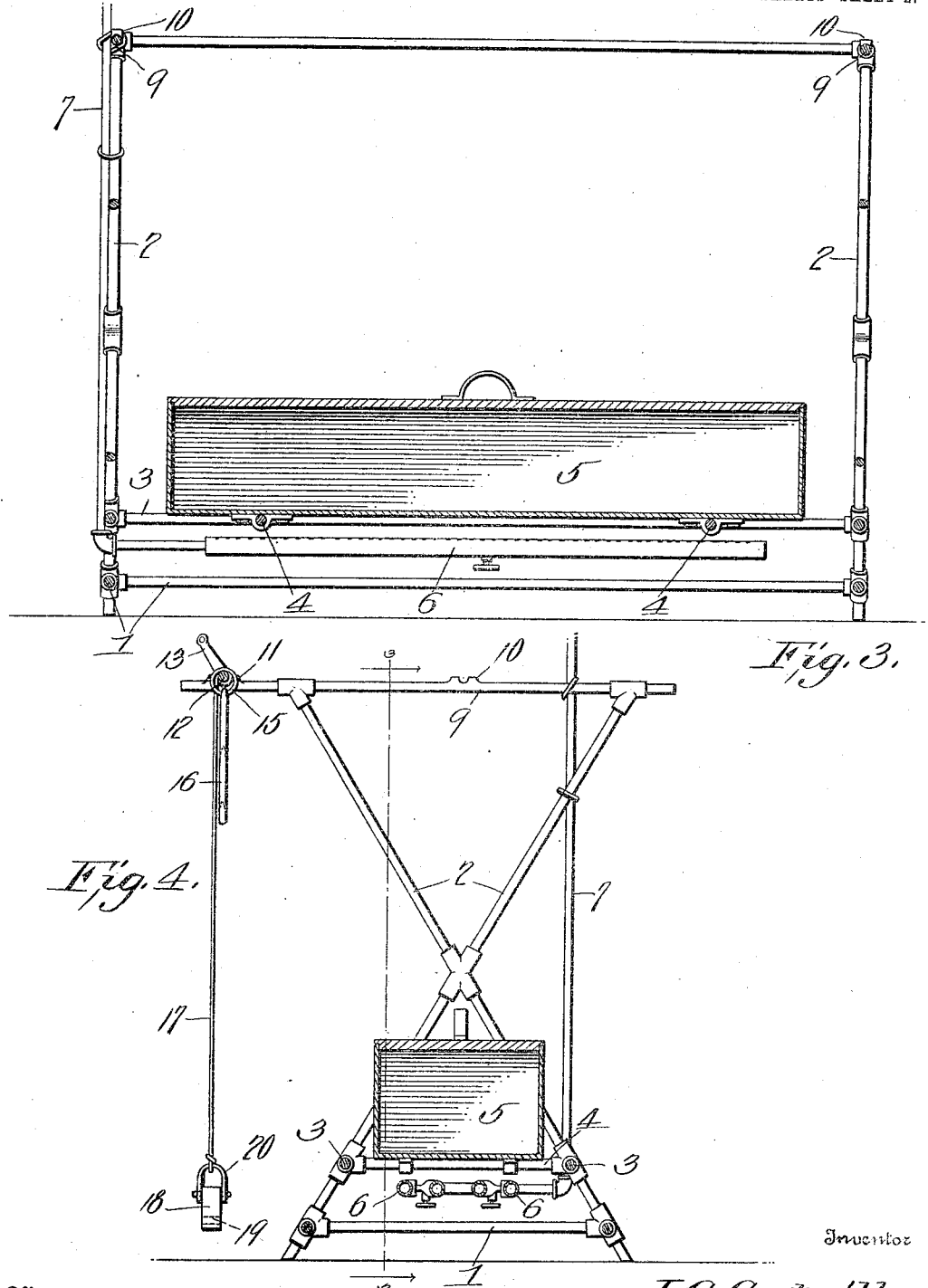

UNITED STATES PATENT OFFICE.

JOHN CABBATT CARTMILL, OF LEADMINE, WISCONSIN.

VAT FOR CLEANING HOGS.

944,230.  Specification of Letters Patent.  Patented Dec. 21, 1909.

Application filed April 21, 1909. Serial No. 491,340.

*To all whom it may concern:*

Be it known that I, JOHN CABBATT CARTMILL, a citizen of the United States, residing at Leadmine, in the county of Lafayette and State of Wisconsin, have invented a new and useful Improvement in a Vat for Cleaning Hogs, of which the following is a specification.

This invention relates to a device for scalding and cleaning hogs, the object of the invention being to furnish means which will make the operation easier, thereby decreasing the amount of labor required, as well as saving time.

Figure 1:
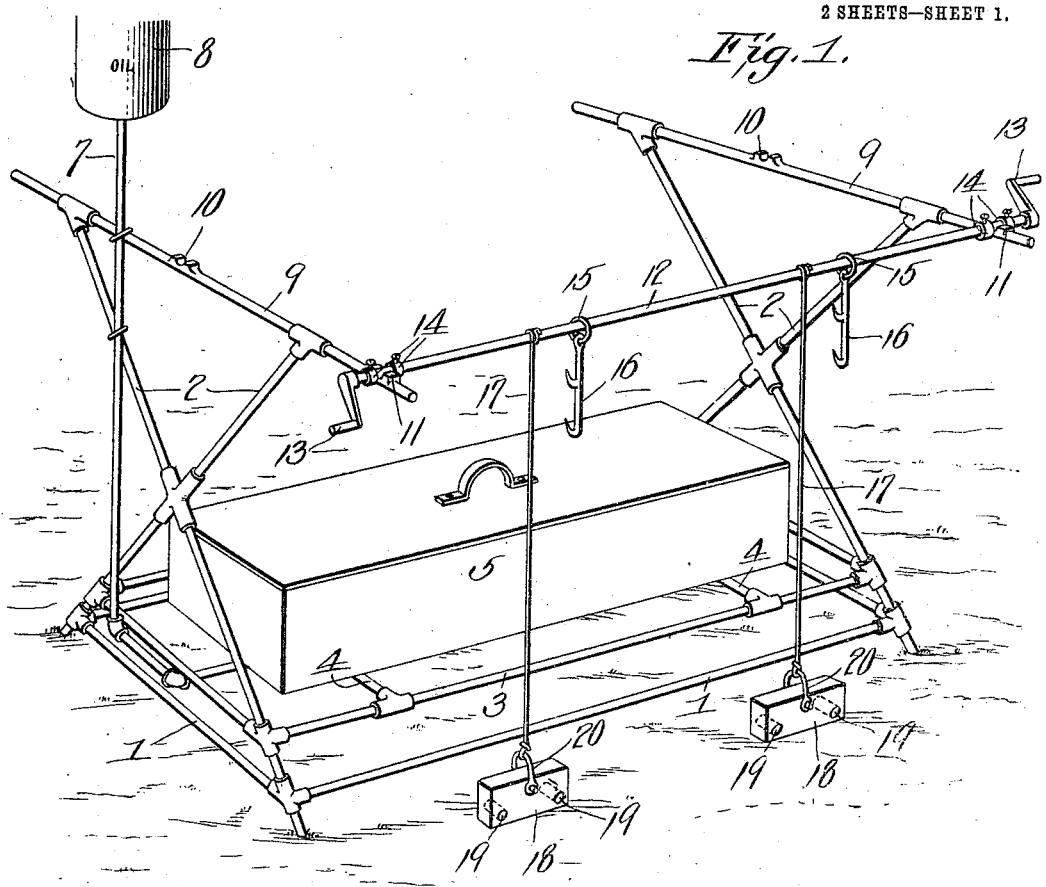
Figure 2:
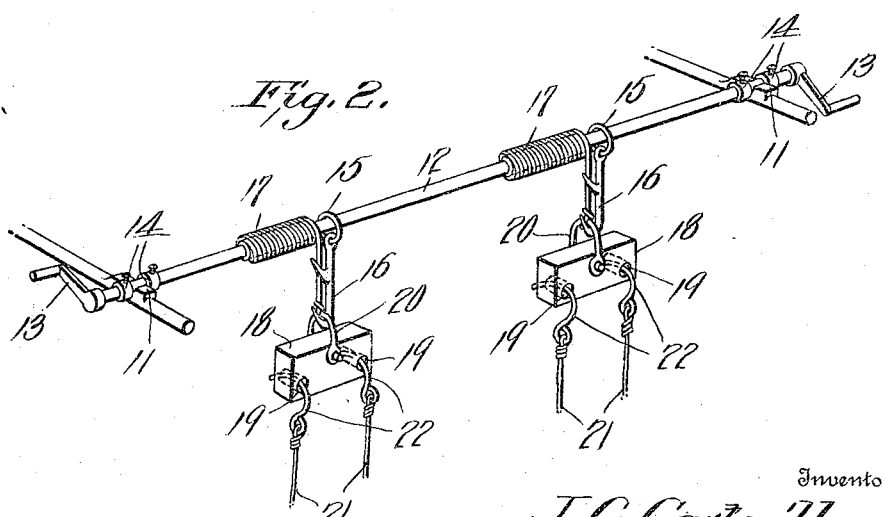

The invention consists of the novel features of construction, hereinafter fully described, pointed out in the claims and shown in the accompanying drawings, in which, Figure 1 is a perspective view of the device. Fig. 2 is an enlarged perspective view of a windlass and connecting parts. Fig. 3 is a longitudinal vertical section taken on the line 3—3 of Fig. 4. Fig. 4 is a transverse section taken through the vat and the supporting frame.

In the accompanying drawings I have shown a frame which may be constructed of rods but which I have shown as constructed of gas pipe and in which 1 represents a suitable rectangular horizontal base slightly elevated above the ground and having at the ends uprights 2, formed of intersecting pipe sections and forming X-shaped end frames. Above the base 1 is a second horizontal frame 3 also connected to the uprights 2 and braced by suitable cross-pieces 4. The frame 3 supports a rectangular vat 5 beneath which is arranged a gasolene or oil burner 6 of any desired construction, the burner being fed by a supply pipe 7 from a tank 8. Each of the end frames 2 is provided with a cross-piece 9, said cross-pieces being arranged transversely with respect to the base 1, and it will be noted that there are no elevated side bars to prevent ready access to the vat. The cross-bars 9 are provided midway their ends with bearings 10 and adjacent one end with bearings 11. Rotatably resting in these bearings is a windlass 12 provided at each end with crank handles 13 and also adjacent each end with collars 14 which prevent longitudinal sliding of the windlass. This windlass can be moved freely from the bearings 10 to the bearings 11 as desired. Rings 15 are mounted upon the windlass and are provided with depending hooks 16. Cables 17 are adapted to wind upon the windlass and blocks 18 are provided with corner openings 19 and with a clevis 20 to which the tables 17 are connected. I also provide foot ropes 21 having hooks 22, designed to fit in the openings 19.

In operation the windlass is first placed in the bearings 11 with the blocks 18 adjacent the ground. The ropes 21 are secured to the feet of the hog and the hooks 22 are then engaged with the openings 19 of the blocks 18. The windlass is then rotated winding the cables 17 upon the windlass and drawing up the blocks 18 until the hooks 16 can be engaged in the clevises 20 thus holding the blocks in elevated position with the hog supported therefrom. The windlass is then lifted from the bearings 11 and moved over to the bearings 10. The hooks 16 are then disengaged from the clevises 20 and the blocks are then lowered thus depositing the hog into the vat. After it has been scalded the cables are again wound upon the windlass 12, the hooks 16 engaged with the clevises 20 and the windlass moved back to the bearings 11 and the cleaning operation can then be commenced.

It will be obvious that minor changes in the construction of the frame 2 and the formation of the bearings can be made without in any way affecting the operation or use of the device as above described.

What I claim is:—

1. A device of the kind described comprising a rectangular base, a vat supported above said base, a burner for heating the vat, end frames carried by the base, bearings carried by each end frame, a windlass resting loosely in said bearings and movable from one to the other, cables winding upon the windlass, blocks having corner perforations, a clevis secured to each block, said blocks being supported by the cables, foot ropes having hooks adapted to engage the perforations of the blocks, rings mounted on the windlass and hooks carried by said rings for engagement with the clevises, as and for the purpose set forth.

2. A device of the kind described comprising a pipe frame consisting of two rectangular frames one above the other, an X-shaped upright frame at each end of the horizontal frames, the upright frames being connected to the horizontal frames, a vat mounted upon the upright horizontal frame, means for heating said vat, cross-members supported by the upright frames, said cross-members being transverse with respect to the horizontal frames, bearings carried by the cross-members adjacent their ends, a windlass turning loosely in said bearings and movable from one set of bearings to the other, means carried by said windlass for lifting a weight into an elevated position, and means for locking said weight in said elevated position, as and for the purpose set forth.

JOHN CABBATT CARTMILL.

Witnesses:
B. A. COULTHARD,
W. B. VAIL.